United States Patent
Zawacki et al.

(10) Patent No.: US 10,082,282 B2
(45) Date of Patent: Sep. 25, 2018

(54) LIGHT ASSEMBLY WITH LED STRING

(71) Applicant: GM GLOBAL TECHNOLOGY OPERATIONS LLC, Detroit, MI (US)

(72) Inventors: Jeffrey T. Zawacki, Oxford, MI (US); Michael K. Larsen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 15/181,984

(22) Filed: Jun. 14, 2016

(65) Prior Publication Data

US 2017/0356635 A1    Dec. 14, 2017

(51) Int. Cl.

| | |
|---|---|
| *B60Q 1/04* | (2006.01) |
| *F21S 4/00* | (2016.01) |
| *F21V 23/00* | (2015.01) |
| *B60Q 1/34* | (2006.01) |
| *F21V 19/00* | (2006.01) |
| *F21V 23/04* | (2006.01) |
| *F21S 41/141* | (2018.01) |
| *F21S 41/20* | (2018.01) |
| *F21S 43/14* | (2018.01) |
| *F21S 43/20* | (2018.01) |
| *F21S 4/26* | (2016.01) |

(Continued)

(52) U.S. Cl.
CPC ............ *F21V 23/003* (2013.01); *B60Q 1/343* (2013.01); *F21S 4/26* (2016.01); *F21S 41/141* (2018.01); *F21S 41/285* (2018.01); *F21S 43/14* (2018.01); *F21S 43/26* (2018.01); *F21V 19/005* (2013.01); *F21V 23/001* (2013.01); *F21V 23/04* (2013.01); *F21V 21/0808* (2013.01); *F21Y 2115/10* (2016.08)

(58) Field of Classification Search
CPC .......... B60Q 1/343; B60Q 1/269; B60Q 1/30; B60Q 1/34; B60Q 1/0052; B60Q 1/2696; F21S 48/115; F21S 48/1225; F21S 48/215; F21S 48/2212; F21S 4/00; F21S 4/20; F21S 4/22; F21V 9/16; F21V 23/001; F21V 23/003; F21Y 2103/10; F21Y 2113/10; F21K 9/64; H01L 33/62
See application file for complete search history.

(56) References Cited

U.S. PATENT DOCUMENTS 5,084,804 A * 1/1992 Schairer ................ F21S 48/215
257/E25.02
6,565,251 B2 * 5/2003 Chen ......................... F21S 4/20
362/236

(Continued)

Primary Examiner — Peggy Neils
(74) Attorney, Agent, or Firm — Quinn IP Law

(57) ABSTRACT

A light-emitting diode (LED) string includes an electrically conductive wire and a plurality of LEDs. The LEDs are electrically connected to the wire in series along an axial length of the wire. The LED string may include a solder layer, with the LEDs electrically connected to the wire via the solder layer. A tube having an optional phosphor coating may circumscribe the wire and LEDs. When connected to a surface, the LED string emits light in a band of at least 180 degrees with respect to the surface. A light assembly includes a first surface and a first LED string configured as set forth above. The light assembly may include a second LED string positioned with respect to the surface and having additional LEDs configured to illuminate in response to a second control signal from the controller.

20 Claims, 2 Drawing Sheets

(51) Int. Cl.
*F21V 21/08* (2006.01)
*F21Y 115/10* (2016.01)

(56) References Cited

U.S. PATENT DOCUMENTS

| | | | | |
|---|---|---|---|---|
| 7,513,665 | B2* | 4/2009 | Chinniah | F21S 48/1329 362/308 |
| 8,314,558 | B2* | 11/2012 | Dassanayake | F21S 48/1136 315/82 |
| 8,950,918 | B2* | 2/2015 | Langkabel | B60Q 1/04 362/294 |
| 2013/0242583 | A1* | 9/2013 | Tsai | B62J 6/02 362/473 |
| 2014/0268858 | A1* | 9/2014 | Norris | F21S 48/22 362/545 |
| 2015/0078025 | A1* | 3/2015 | Kleiner | F21S 48/1241 362/511 |
| 2015/0377428 | A1* | 12/2015 | Chen | F21V 9/16 362/84 |
| 2017/0241611 | A1* | 8/2017 | Pan | F21S 48/212 |
| 2017/0321849 | A1* | 11/2017 | Xiong | F21K 9/278 |

\* cited by examiner

LIGHT ASSEMBLY WITH LED STRING

TECHNICAL FIELD

The present disclosure pertains to an LED string and a light assembly using the same.

BACKGROUND

Lighting is used for various functional and aesthetic purposes. For instance, attaching a lighting assembly to or near a surface helps improve visibility both of the lighted surface and the surrounding environment. In vehicle applications in particular, ambient lighting features may be connected to trim pieces to enhance low-light visibility within a vehicle interior. External vehicle lighting is typically provided via headlight and taillight assemblies positioned at the front and rear of the vehicle, respectively. Vehicle external lighting functions range include the daytime running light or "DRL" function, position function, and turn signal indication.

SUMMARY

A light-emitting diode (LED) string is disclosed herein that provides light distribution in a range of 180 degrees or more with respect to a surface depending on the embodiment. Relative to LED light pipes and conventional LED fixtures, the LED string disclosed herein is intended to provide low-profile packaging benefits, weight reduction, and unique styling alternatives.

In a non-limiting example application, the LED string may be used as part of a vehicle headlight assembly to provide daytime running light (DRL), position, and/or front turn lighting functions of the type known in the art. Other example lighting applications may include interior or exterior vehicle ambient or task lighting. Non-vehicle applications may also be envisioned, including appliance lighting, accent lighting, and room lighting, as the LED string may be connected to any suitable surface with respect to which the presently disclosed lighting effects are desirable.

The LED string may include an electrically conductive wire, e.g., a cylindrical length of copper wire. The LED string has an axial length, with multiple LEDs electrically connected in series to a surface of the wire along the axial length. The LED electrically string may include a solder layer. In such an embodiment the individual LEDs may be electrically connected to the wire via the solder layer. Alternatively, the individual LEDs may be separately soldered or conductively bonded to the wire.

The LEDs may be treated to emit white light or light of any desired color, e.g., amber light for providing a front turn signal indication. Additionally, the LED string may include a cylindrical tube circumscribing the wire and the LEDs arranged along the axial length of the wire. The tube may have a phosphor coating to help produce a desired color of light or white light.

When connected to a surface, the LED string emits light in a band of at least 180 degrees with respect to the surface. The surface may be transparent in some embodiments, such as in the case of a transparent acrylic or plastic lens. The LEDs may be arranged on opposite sides of the wire in such a transparent embodiment, with the light emitted up to 360 degrees with respect to the surface to which the LED string is connected.

A light assembly is also disclosed herein that includes a component surface and one or more of the LED strings described above. Each LED string includes the electrically conductive wire and LEDs electrically connected to the wire in series along the axial length of the wire. The LED strings are connected to the same or different component surfaces.

The component surface may be a surface of a headlight assembly in an example embodiment. In such an embodiment, the LEDs may be configured to illuminate in response to a first control signal from a controller. For instance, the first control signal may be a turn signal or a transmission position signal, e.g., for indicating a turn front lighting function, a DRL function, or a position function in different embodiments.

Another LED string may be positioned with respect to the component surface and include additional LEDs configured to illuminate in response to a second control signal from the controller. All of the LEDs of one of the LED strings may be the same color such as all amber LEDs, e.g., configured to emit amber light suitable for turn function indication, and all of the LEDs of the additional LED string may be the same color, e.g., all white LEDs configured to emit white light for the DRL or position functions.

The above and other features and advantages of the present disclosure are readily apparent from the following detailed description of the best modes for carrying out the disclosure when taken in connection with the accompanying drawings.

DETAILED DESCRIPTION

Figure 1:
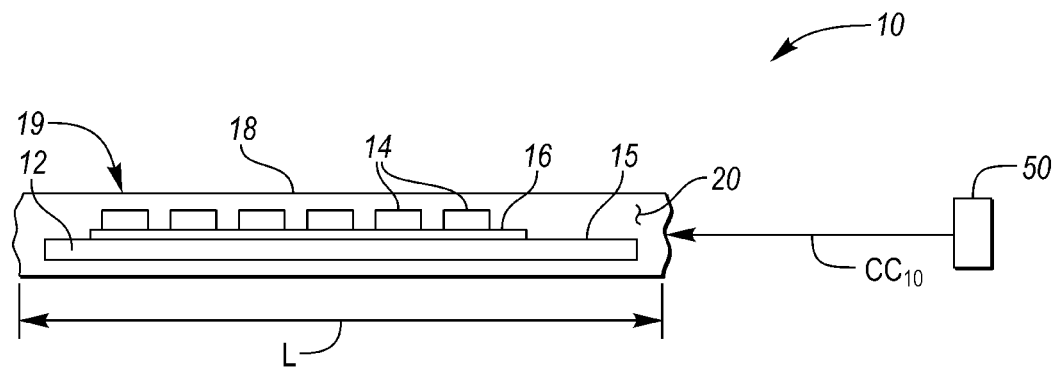
FIG. 1 is a schematic illustration of an example LED string configured as set forth herein.
Figure 2:
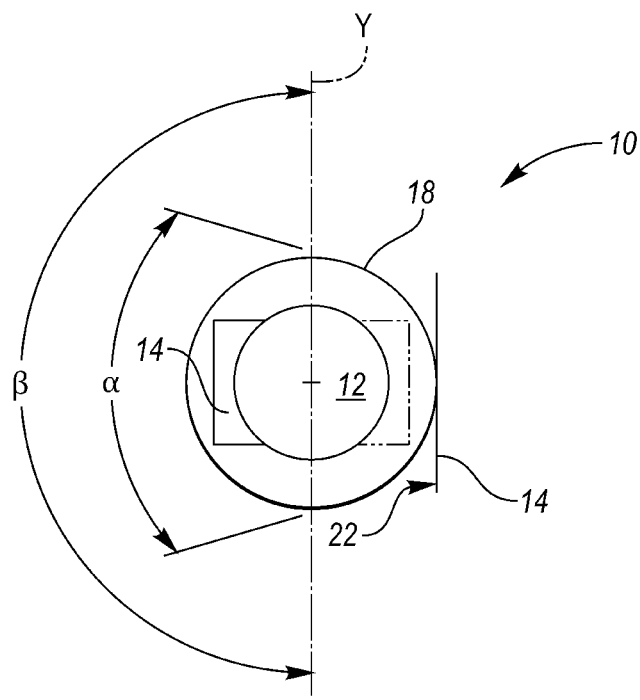
FIG. 2 is a schematic side view illustration of the LED string shown in FIG. 1.

Referring to the drawings, wherein like reference numbers refer to the same or like components in the several Figures, and beginning with FIG. 1, an example light-emitting diode (LED) string 10 is shown that includes an electrically conductive wire 12 having an axial length (L). The wire 12 may be cylindrical as shown in FIG. 2, or it may be an elongated flattened strip, in either case being constructed of copper or another suitable electrical conductor. The LED string 10 further includes a plurality of LEDs 14 each of which is electrically connected to an external surface 15 of the wire 12 along the axial length (L). The LED string 10 may include a solder layer 16, such that the individual LEDs 14 are electrically connected to the wire 12 via the intervening solder layer 16. The solder layer 16 may be any continuous layer of suitable solder material, e.g., a mixture of tin and lead or a lead-free solder in different embodiments. In other embodiments the individual LEDs 14 may be individually soldered or bonded to the external surface 15.

The individual LEDs 14 may be arranged in a series of alternating colors, such that the light emitted by the LEDs 14 blends to form a desired color and aesthetic appearance. Such an appearance may be tailored to the intended application. For instance, in the non-limiting example vehicle headlight assembly shown in FIGS. 3 and 4, the LEDs 14 may be embodied as alternating white and amber LEDs 14. Alternatively, the LED string 10 may include LEDs 14 of a single color, e.g., amber LEDs 14 for use as a front turn signal indicator, red LEDs 14 when used as part of a taillight assembly, or white LEDs 14 when used as a daytime running light (DRL) or position indicator.

The LED string 10 shown schematically in FIG. 1 may also include a cylindrical tube 18, e.g., a flexible length of a transparent or translucent polymer, plastic, or acrylic material. Such a tube 18 may circumscribe and encapsulate the wire 12 and the LEDs 14, thereby protecting the wire 12 and LEDs 14 from contact and debris. In some embodiments, a phosphor coating 19 may be applied to an outer surface 20 of the tube 18. As is well known in the art, white light may be produced from a short wavelength LED 14, e.g., a blue LED 14, when photons generated by the LED 14 pass through the phosphor coating 19. White light may also be produced by combining red, green, and blue LEDs 14 in different combinations along the axial length (L) of the wire 12. Either embodiment may be used as part of the LED string 10.

Figure 5:
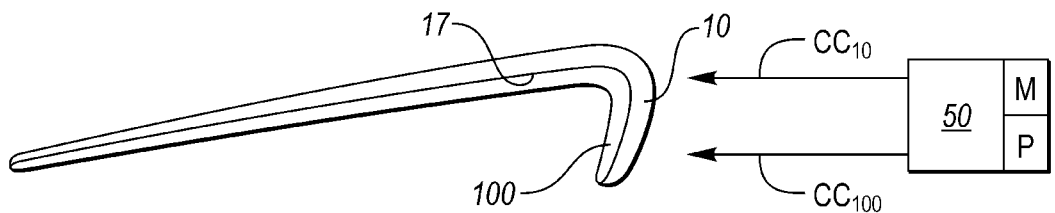
FIG. 5 is a schematic illustration of a pair of individually-addressable LED strings according to a possible embodiment.

A control device 50 such as a controller or a user input device, e.g., a knob, switch, touch screen, turn signal lever, or transmission position/PRNDL lever, may generate a lighting control signal (arrow $CC_{10}$). The lighting control signal (arrow $CC_{10}$) provides or results in connection of the wire 12 to a power supply (not shown), e.g., an auxiliary battery or an auxiliary output of a voltage regulator, so as to illuminate the LEDs 14 arranged along the axial length (L). As shown in FIG. 5 and discussed below, multiple LED strings 10, 100 may be used and individually controlled via corresponding lighting control signals (arrows $CC_{10}$, $CC_{100}$) in other embodiments, e.g., with the LEDs 14 illuminating in response to a control signal corresponding to a front turn signal control signal or a transmission position signal in the vehicle 30 of FIG. 3, e.g., a DRL activation signal.

As shown in FIG. 2, the LED string 10 may be connected to a component surface 22, e.g., a surface of a panel, system, lighting assembly, or other surface of which lighting is desired. The LED string 10 may be connected to the component surface 22 by use of a suitable adhesive material or by entrapping the LED string 10 in a mating channel (not shown), e.g., a U-channel disposed around a perimeter of a component having the component surface 22.

When the LEDs 14 are arranged or linearly aligned in series on a common surface or side of the wire 12, e.g., so that all LEDs 14 are on one side of an axis Y bisecting the wire 12 and aligned when viewing the wire 12 from one end, the LED string 10 emits light in a light cone ($\alpha$) of about 35 to 40 degrees with respect to the component surface 22, which exits the tube 18 and spreads to a wider band ($\beta$) of at least 180 degrees with respect to the component surface 22. Alternatively, the LEDs 14 may be connected to both sides of the wire 12 as shown in phantom so as to distribute light more than 180 degrees with respect to the component surface 22. When the component surface 22 is transparent, e.g., is configured as a molded plastic trim piece or a lens of the example headlight assembly shown in FIGS. 3 and 4, a full 360-degree lighting effect may be achieved.

Figure 3:
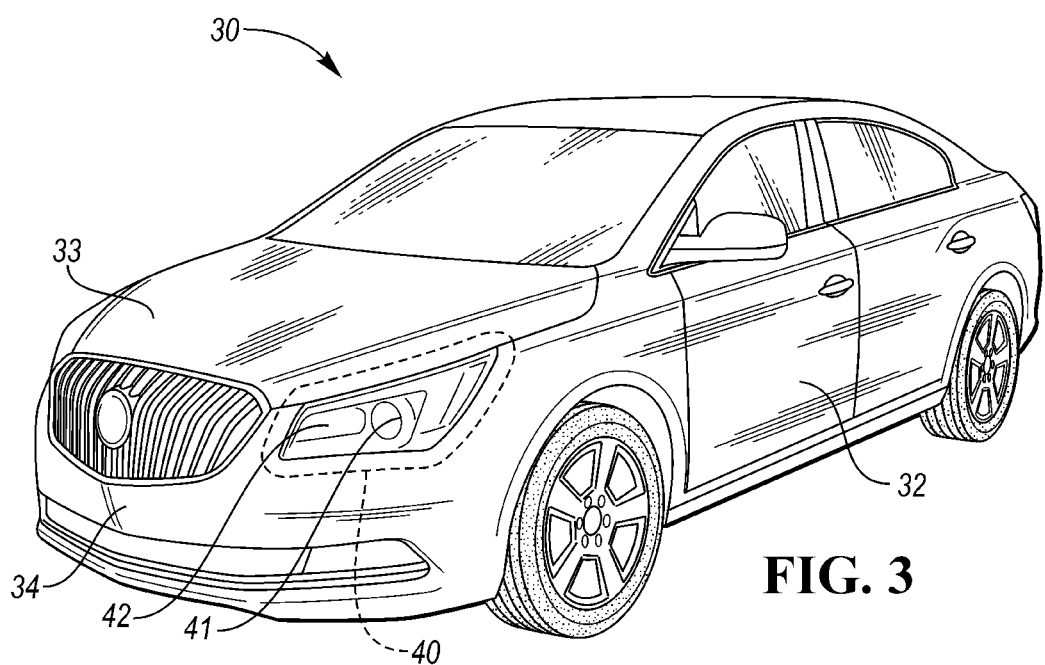
FIG. 3 is a schematic perspective view illustration of an example vehicle having a light assembly with an LED string as described herein.
Figure 4:
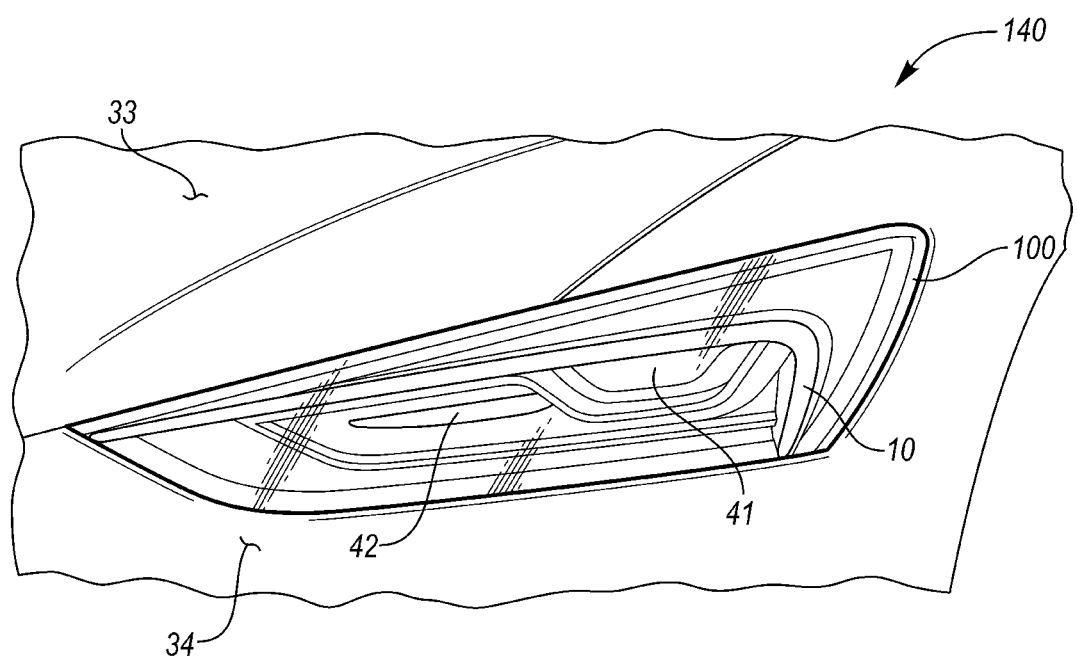
FIG. 4 is a schematic perspective view illustration of an example headlight application usable with the vehicle shown in FIG. 1.

Due to the flexible nature of the LED string 10 and the low pixilation of light emitted by the LED string 10, more homogenously lit images or visual effects may be enjoyed in various possible applications. One such application is shown in FIGS. 3 and 4. A vehicle 30 as shown in FIG. 3 includes a body 32 having a hood 33 and front fascia piece 34. The vehicle 30 may also include a headlight assembly 40 as shown in FIGS. 3 and 4, positioned with respect to the body 32, i.e., between the hood 33 and the front fascia piece 34. The headlight assembly 40 may house a low-beam function 41 and a high-beam function 42, both of which are conventional. The LED string 10 may be configured in an arcuate shape as best shown in FIGS. 4 and 5 at least partially surrounding the low-beam and high-beam functions 41 and 42, respectively.

As shown in FIG. 4, the LED string 10 may be arranged with respect to the light assembly 40, with example functions such as turn signal indication, DRL, and position lighting being dedicated to the LED string 10. More than one LED string 10 may be used, e.g., an additional LED string 100 may be used, with each LED string 10 and 100 dedicated to a particular lighting function. For instance, first and second LED string 10 and 100 may be connected to the same or different surfaces of a light assembly 140, for instance side-by side in a common channel or adhered to different parts of the light assembly 140 as shown in FIG. 4.

Referring to FIG. 5, in some embodiments the LEDs 14 illuminate in response to the lighting control signal (arrow $CC_{10}$ or $CC_{100}$) from the control device 50. The lighting control signal (arrow $CC_{10}$) may correspond to a turn signal, for instance. The lighting control signal (arrow $CC_{100}$) may be embodied as a transmission position signal, e.g., when the control device 50 is configured as a PRNDL lever or is responsive to movement thereof. When the light assembly 40, 140 of FIGS. 3 and 4 use two or more LED strings 10, 100 separated by an interface 17, with each of the LED strings 10, 100 configured to illuminate in response to a corresponding control signal (arrow $CC_{10}$, $CC_{100}$). For instance, a front turn signal may illuminate one LED string 10 so that amber light is emitted, with all LEDs 14 of that LED string 10 being amber LEDs 14, and a PRNDL position signal may illuminate another LED string 100 in white, with all LEDS of the additional LED string 10 being configured to emit white light, e.g., as yellow phosphor-coated blue LEDs 14. The LED string 10 may include alternating white and yellow LEDs 14 to eliminate or reduce the need for such a phosphor coating.

The control device 50 may be a body control module (BCM) in some embodiments, and may include a processor (P) and memory (M), i.e., sufficient amounts of read-only memory, optical memory, flash memory, and the like. Transitory memory such as random access memory and electrically-erasable programmable read-only memory may also be included as needed, along with other required circuitry, including but not limited to a high-speed clock, analog-to-digital circuitry, digital-to-analog circuitry, a digital signal processor, and any necessary input/output devices and other signal conditioning and/or buffer circuitry.

While the best modes for carrying out the disclosure have been described in detail, those familiar with the art to which this disclosure relates will recognize various alternative designs and embodiments within the scope of the appended claims.

The invention claimed is:

1. A light-emitting diode (LED) string connectable to a component, the LED string comprising:
    an electrically conductive wire having a cylindrical body, an axial length, and opposing first and second sides extending longitudinally along the axial length of the wire, the first side of the wire being mounted to a component surface of the component; and
    a plurality of LEDs electrically connected to and mounted on the second side of the electrically conductive wire and aligned in series along the axial length, wherein the LEDs are configured to emit light from the component surface in a band of at least 180 degrees with respect to a circumference of the cylindrical body of the wire.

2. The LED string of claim 1, further comprising a solder layer, wherein the plurality of LEDs are electrically connected to the electrically conductive wire via the solder layer.

3. The LED string of claim 1, wherein the plurality of LEDs includes alternating white and amber LEDs.

4. The LED string of claim 1, further comprising a tube having a phosphor coating and circumscribing the wire and the plurality of LEDs.

5. The LED string of claim 1, wherein the component is a vehicle light assembly, and wherein the plurality of LEDs includes only amber light-emitting LEDs, the amber light-emitting LEDs being configured to illuminate in response to a control signal corresponding to a front turn signal in a vehicle.

6. The LED string of claim 1, wherein the component is a vehicle light assembly, and wherein the plurality of LEDs includes only white light-emitting LEDs, the white light-emitting LEDs being configured to illuminate in response to a control signal corresponding to a transmission position signal in a vehicle.

7. The LED string of claim 6, wherein the transmission position signal corresponds to a daytime running light activation signal.

8. A light assembly for a motor vehicle having a vehicle body, the light assembly comprising:
a light assembly housing configured to mount to the vehicle body and having a housing surface; and
a light-emitting diode (LED) string having:
an electrically conductive wire having a cylindrical body, an axial length, and opposing first and second sides extending longitudinally along the axial length of the wire, the first side of the wire being mounted to the housing surface of the light assembly housing; and
a plurality of LEDs each electrically connected to and mounted on the second side of the electrically conductive wire in series along the axial length,
wherein the LEDs are configured to emit light from the housing surface in a band of at least 180 degrees with respect to a circumference of the cylindrical body of the wire.

9. The light assembly of claim 8, wherein the motor vehicle includes a control device, and wherein the LEDs are configured to illuminate in response to a first control signal from the control device.

10. The light assembly of claim 9, wherein the first control signal is a front turn signal.

11. The light assembly of claim 9, wherein the first control signal is a transmission position signal.

12. The light assembly of claim 9, further comprising an additional LED string, wherein the additional LED string is positioned with respect to the component surface and includes additional LEDs configured to illuminate in response to a second control signal from the control device.

13. The light assembly of claim 12, wherein the first and second control signals are a turn signal and a transmission position signal, respectively.

14. The light assembly of claim 8, wherein all of the LEDs of the LED string are the same color.

15. The light assembly of claim 8, further comprising a high-beam function and a low-beam function housed within the light assembly housing, and wherein the LED string is configured in an arcuate shape at least partially surrounding the high-beam and low-beam functions.

16. The light assembly of claim 8, further comprising a solder layer, wherein the plurality of LEDs are electrically connected to the electrically conductive wire via the solder layer.

17. The light assembly of claim 8, wherein the plurality of LEDs includes alternating white light-emitting and amber light-emitting LEDs.

18. The light assembly of claim 8, further comprising a polymer or plastic tube circumscribing the electrically conductive wire and the plurality of LEDs.

19. The light assembly of claim 18, wherein the tube includes a phosphor coating.

20. A motor vehicle comprising:
a vehicle body with opposing front and rear ends; and
a light assembly disposed at the front end or the rear end of the vehicle body, the light assembly including:
a light assembly housing mounted to the vehicle body;
a low-beam lamp mounted inside the light assembly housing;
a high-beam lamp mounted inside the light assembly housing adjacent the low-beam lamp;
an electrically conductive wire having an elongated cylindrical body with an axial length, and opposing first and second sides extending longitudinally along the axial length of the wire, the first side of the wire being mounted to a housing surface of the light assembly housing such that the wire partially surrounds both the low-beam and high-beam lamps; and
a plurality of LEDs each electrically connected to and mounted on the second side of the wire, the LEDs being aligned in series along the axial length of the wire, the LEDs being configured to emit light radially outward from the wire in a light band of at least 180 degrees with respect to a circumference of the cylindrical body of the wire.

* * * * *